United States Patent [19]

Rybny et al.

[11] 4,113,592
[45] Sep. 12, 1978

[54] TRIHALOGENATED HYDROCARBONS AS CO-PHOTOINITIATORS

[75] Inventors: Charles B. Rybny, Clifton; John C. Trebellas, Berkeley Heights, both of N.J.; Donald E. Sargent, Greenfield Center, N.Y.

[73] Assignee: Celanese Corporation, New York, N.Y.

[21] Appl. No.: 568,216

[22] Filed: Apr. 14, 1975

[51] Int. Cl.$^2$ .............................. C08F 8/00; C08F 2/46
[52] U.S. Cl. ............................. 204/159.16; 96/115 P; 204/159.15; 204/159.17; 204/159.18; 204/159.23; 204/159.24; 260/837 R; 260/42.28; 427/54
[58] Field of Search ...................... 204/159.15, 159.16, 204/159.17, 159.18, 159.23, 159.24; 96/115 P, 115 R; 427/54

[56] References Cited

U.S. PATENT DOCUMENTS

| | | | |
|---|---|---|---|
| 3,042,518 | 7/1962 | Wainer | 96/48 |
| 3,042,519 | 7/1962 | Wainer | 96/48 |
| 3,551,235 | 12/1970 | Bassemir et al. | 204/159.15 |
| 3,759,807 | 9/1973 | Osborn et al. | 204/159.23 |
| 3,769,023 | 10/1973 | Lewis et al. | 96/115 P |
| 3,820,993 | 6/1974 | Lewis et al. | 96/35.1 |
| 3,874,376 | 4/1975 | Dart et al. | 128/90 |
| 3,966,573 | 6/1976 | Bean | 204/159.23 |

*Primary Examiner*—Richard B. Turer
*Attorney, Agent, or Firm*—Kenneth A. Genoni

[57] ABSTRACT

The use of terminal trichlorinated, brominated or iodinated hydrocarbons as co-photoinitiators in combination with standard photoinitiators in ultraviolet curable coating compositions is disclosed.

11 Claims, No Drawings

TRIHALOGENATED HYDROCARBONS AS CO-PHOTOINITIATORS

BACKGROUND OF INVENTION

This invention relates to ultraviolet curable coating compositions and to a method for preparing and curing same. More particularly, this invention relates to a method for improving the cure response properties of ultraviolet radiation curable coatings.

Ultraviolet curable coating compositions utilizing titanium dioxide or other metal oxide pigments have been deficient in cure rates and cure response. This is thought to occur because of the ultraviolet reflection and absorption characteristics in certain ultraviolet wave lengths of titanium dioxide type pigments. Thus, it has been partically impossible to utilize titanium dioxide in ultraviolet curable coatings compositions. Likewise, many photoinitiators, such as, for example, benzophenone, benzyl, thioxanthone, and the like, are extremely expensive and the amounts of these materials required have greatly increased the cost of ultraviolet curable coating compositions.

Thus, it is an object of this invention to prepare ultravoilet curable coatings containing titanium dioxide-type pigments which exhibit normal cure response properties.

It is another object of this invention to prepare inexpensive ultraviolet coating compositions.

It is another object of this invention to prepare ultraviolet curable coating compositions which require smaller amounts of standard ultraviolet photoinitiators.

SUMMARY OF INVENTION

Basically, this invention involves the discovery that ultraviolet curable coating compositions containing titanium dioxide pigments may be prepared if, in addition to standard photoinitiators, up to about 500 percent, by weight, based upon the photoinitiator content, of a perhalogenated photoinitiator is employed. By utilizing this process, it is possible to obtain ultraviolet curable coating compositions, using titanium dioxide pigments, which exhibit cure properties equivalent to those obtained in the prior art without the use of titanium dioxide-type pigments. Furthermore, by utilizing the perhalogenated compounds of this invention, which are generally much less expensive than the prior art photoinitiators, it is possible to substantially reduce the cost of the ultraviolet curable compositions.

DESCRIPTION OF INVENTION

The ultraviolet curable compositions of the instant invention contain from about 40 to about 100 percent, by weight, based upon the total curable composition, of an alpha beta ethylenically unsaturated vinyl polymerizable compound containing at least two vinyl polymerizable groups per molecule. Included are unsaturated esters of polyols and particularly such esters of the alpha methylene carboxylic acids, e.g., ethylene diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetraacrylate and methacrylate, trimethylolpropane triacrylate, trimethylolethane triacrylate, dipentaerythritol hexacrylate, tripentaerythritol octaacrylate, sorbitol hexacrylate, 1,3-propanediol diacrylate, 1,5-pentanediol dimethacrylate, hexanediol diacrylate, the bis-acrylates and methacrylates of polyethylene glycols of a molecular weight of 200–1,500, and the like; unsaturated amides, particularly those of the alpha methylene carboxylic acids, especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gamma-methacrylamidopropoxy)ethane, beta-methacrylamidoethyl methacrylate, N-beta-hydroxyethyl-beta-(methacrylamido) ethyl acrylate, and N,N-bis(beta-methacryloxyethyl) acrylamide; vinyl esters such as divinyl succinate, divinyl adipate, divinyl phthalate, divinyl terephthalate, divinyl benzene-1,3-disulfonate, and divinyl benzene-1,4-disulfonate; styrene and derivatives thereof and unsaturated aldehydes, such as sorbaldehyde (hexadienal). An outstanding class of these preferred addition polymerizable components are the esters and amides of alpha-methylene carboxylic acids and substituted carboxylic acids with polyols and polyamides wherein the molecular chain between the hydroxyl and amino groups is solely carbon or oxygen-interrupted carbon.

The polyethylenic unsaturation can be present as a substituent attached to a preformed polymer resin, such as an alkyd, a polyester, a polyamide, a polyurethane or a vinyl homo- or copolymer. Also included are polymers containing maleic and fumaric acids or esters, as well as polymeric unsaturated materials prepared by reacting vinyl hydroxy or carboxy materials with polyepoxides, e.g., acrylic acid with the diglycidyl ether of bisphenol A. Also included are polymers such as polyvinyl acetate/acrylate, cellulose acetate/acrylate, cellulose acetate/methacrylate, N-acryloxymethylpolyamide, N-methacryloxymethylpolyamide, allyloxymethylpolyamide, etc.

In addition to the aforementioned polyfunctional polymerizable compounds, compounds containing a single polymerizable ethylenically unsaturated group of the structure

can also be utilized. In addition to traditional "monomers", as described hereafter, the mono-unsaturated compounds may be polymeric materials, as previously described, containing on the average a single site of unsaturation on each polymer molecule. These monomers can be aliphatic, aromatic, cycloaliphatic or any variant thereof. Among the monomers are included styrene, 4-methylstyrene, alphamethylstyrene, and the like; acrylic acid and its nitrile, amide and $C_1$–$C_{12}$ alkyl, aryl, or hydroxy alkyl derivatives, such as acrylonitrile, ethylacrylate, 2-ethylhexyl acrylate, butoxy- or ethoxyethyl acrylates, hydroxyethyl acrylate, as well as others; the vinyl halides, such as vinyl chloride, vinylidene chloride, and the like; vinyl ketones such as vinyl phenyl ketone, vinyl methyl ketone, alpha-chlorovinyl methyl ketone, and the like; the vinyl thioethers such as vinyl ethyl sulfide, vinyl p-tolylsulfide, divinyl sulfide, and the like. Other monomers include vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. Generally any alpha beta ethylenically unsaturated monomer which does not interfere with the ultra-violet curing mechanism may be utilized, and as such, these monomers are well known in the art.

These compounds may be added in amounts up to about 60 percent, by weight, based upon the total curable composition, preferably about 10 to about 30 percent.

The instant invention can also contain up to about 60 percent, by weight, based upon the total curable system of a polymeric material containing no polymerizable unsaturation. Among the polymers are the polyolefins and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenol-formaldehyde polymers, the natural and modified natural polymers, the heterocyclic polymers, and the like.

Illustrative of these polymers are the acrylic polymers such as poly(acrylic acid), poly(methyl acrylate), poly(ethyl acrylate), poly(methacrylic acid), poly(methyl methacrylate), poly(ethyl methacrylate); poly(vinyl chloride); poly(vinyl alcohol); poly(ethylene/propylene/5-ethylidenebicyclo[2.2.1]-hept-2-ene); polyethylene; polypropylene; synthetic rubbers, e.g., butadiene/acrylonitrile copolymers and chloro-2-butadiene 1,3 polymers; the polyesters, copolyesters, polyamides and copolyamides, such as polycaprolactone, poly(caprolactone/vinyl chloride), poly(ethylene glycol terephthalate), poly(hexamethylene succinate), poly(hexamethylene maleate), poly(hexamethylene carbonate), poly(caprolactam), poly(hexamethylene adipamide), and the like; the polyethers such as poly(glutaraldehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymers using ethylene glycol, glycerol, sucrose, etc., as the starter; vinylidene polymers and copolymers, e.g., vinylidene chloride/acrylonitrile, vinylidene chloride/methacrylate and vinylidene chloride/vinyl acetate polymers; ethylene/vinyl acetate copolymers; the polyureas and polyurethanes, such as described in *Polyurethanes: Chemistry and Technology*, Volumes I and II, Sanders and Frisch, published by Interscience Publishers; the polycarbonates; polystyrenes; polyvinyl acetals, e.g., polyvinyl butyral, polyvinyl formal; the cellulose ethers, e.g., methyl cellulose, ethyl cellulose, and benzyl cellulose; the cellulose esters, e.g., cellulose acetate, cellulose acetate succinate and cellulose acetate butyrate; as well as the natural and modified natural polymers such as gutta percha, cellulose, gelatin, starch, silk, wool, and the like; the siloxane polymers and copolymers; the formaldehyde resins such as polyformaldehyde; formaldehyde resins such as phenol-formaldehyde, melamine-formaldehyde, urea-formaldehyde, aniline-formaldehyde and acetone-formaldehyde; phenolic resins and the like.

As previously set out, the photopolymerizable compositions of the instant invention are particularly useful as vehicles for titanium dioxide-based pigments, when used in combination with standard photoinitiators and the perhalogenated photoinitiators of the instant invention. However, the compositions of the instant invention are also useful in non-titanium dioxide-based coatings, as a means of reducing initiator cost.

If desired, the photo-polymerizable compounds can also contain immiscible polymeric or non-polymeric organic or inorganic fillers or reinforcing agents, e.g., the organophilic silicas, bentonites, silica, powdered glass, colloidal carbon, as well as various other types of dyes and pigments, in varying amounts. The fillers are useful in improving the strength, reducing tack and as coloring agents in the coatings of this invention.

This invention involves the discovery that by using certain terminal trihalogenated photosensitizers in amounts ranging up to about 500 percent, by weight, based upon the standard photoinitiator content, improvements in cure response may be obtained. Preferably, the amount of the trihalogenated material added is in the range of about 25 to 200 percent, based upon the amount of the photoinitiators.

The terminal trichlorinated, brominated or iodinated compositions of the instant invention are represented by the general formula

wherein X is bromine, chlorine or iodine, or mixtures thereof, A is bromine, chlorine, iodine, or mixtures thereof, a $C_1-C_{12}$ hydrocarbon, a $C_1-C_{12}$ chlorinated, brominated, or iodinated hydrocarbon, or a $C_1-C_{12}$ carboxylic acid, alcohol, ketone, aldehyde or mixtures thereof, and when all three X's are I, A may in addition be hydrogen; said groups not being interferingly reactive with the ultraviolet cure mechanism. Preferably A is a $C_1-C_{12}$ halogenated hydrocarbon radical. Examples of these materials include trichloroacetic acid, hexachloroethane, 1,1,1,2-tetrachloroethane, carbon tetrachloride, carbon tetrabromide, carbon tetraiodide, iodoform, trichloroacetaldehyde, and the like. The prior art photosensitizers used in the instant invention in combination with the terminal trihalogenated photoinitiators fall into many classes and include compounds such as benzoin derivatives, as disclosed in German Pat. No. F523401VC/396, acetophenone, propiophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, thioxanthone, and chlorinated thioxanthones, 3-chloro-8-nonylxanthone, 3-methoxyxanthone, 3-iodo-7-methoxyxanthone, and the like.

Also included are the acetophenone photosensitizers of the type described in U.S. Pat. No. 3,715,293, having the structure

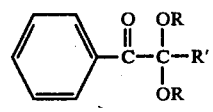

wherein R is alkyl of from 1–8 carbon atoms, or aryl with 6 carbon atoms, and R' is hydrogen, alkyl of from 1–8 carbon atoms, aryl of from 6–14 carbon atoms or cycloalkyl of 5–8 carbon atoms.

The alkylphenone photosensitizers having the formula

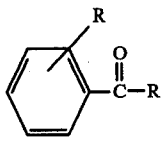

II.

the benzophenone type photosensitizers having the formula

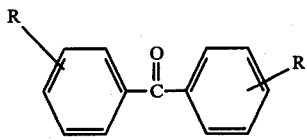

III.

the tricyclic fused ring type having the formula

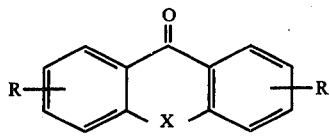

IV.

and the pyridyl type having the formula

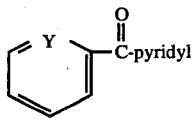

V.

wherein the various substituents are as further described in U.S. Pat. No. 3,759,807, are also included.

Other photosensitizers include 1- and 2-chloroanthraquinone, 2-methylanthraquinone, 2-tertiary butyl anthraquinone, octamethylanthraquinone, 1-4-naphthoquinone, 9-10-phenanthrenequinone, 1,2-benzanthraquinone, 2-3-benzanthraquinone, 2-methyl-1,4-naphthoquinone, 2-3-dichloronaphthoquinone, 1-4-dimethylanthraquinone, 2-3-dimethylanthraquinone, 2-phenylanthraquinone, 2-3-diphenylanthraquinone, sodium salts of anthraquinone alphasulfonic acid, 3-chloro-2-methylanthraquinone and the like. Other photoinitiators which are also useful are described in U.S. Pat. No. 2,760,863 and include vicinal ketadonyl compounds, such as diacetyl benzyl, etc., alpha ketadonyl alcohols, such as benzoin, pivaloin, etc., acyloin ethers, e.g., benzoin methyl and ethyl ethers, etc., alpha hydrocarbon substituted aromatic acyloins, including alphamethyl benzoin, alphaallyl benzoin, and alpha phenyl benzoin. Also included are the diacylhalomethanes, corresponding to one of the general formulas:

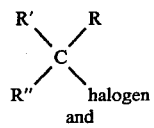

and

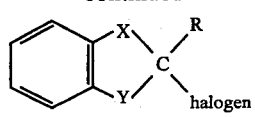

wherein halogen represent a halogen atom such as chlorine or bromine; R represents a hydrogen atom, a chlorine or bromine atom, or an acetyloxy group; R' and R" (same or different) represent a benzoyl group, a nitrobenzoyl group, a dimethylamino benzoyl group, a phenyl sulfonyl group, a carboxy phenyl sulfonyl group, a methylphenyl sulfonyl group, or a naphthoyl group; and X and Y (same or different) represent a carbonyl group or a sulfonyl group. Included are 2-bromo-1,3-diphenyl-1,3-propane dione; 2,2-dibromo-1,3-indane dione; 2,2-dibromo-1,3-diphenyl-1,3-propane dione; 2-bromo-2-(phenylsulfonyl acetal phenone) and the like, as further described in U.S. Pat. No. 3,615,455.

Other photoinitiators are cataloged by G. Delzenne in *Industrie Cimique Belge*, 24 (1959), 739–764. Most preferred among the added initiators are benzoin and its alkyl ethers, benzophenone and its derivatives, as in Formula III, xanthone, thioxanthones, chlorinated thioxanthones, and acetophenone derivatives, as set out in Formula I, and halogenated, aliphatic and aromatic polychlorinated biphenyls and polyphenyls.

The prior art photosensitizers can be added in an amount of up to about 15 percent, by weight, based upon the total curable system, preferably up to about 5 percent.

Although not required, certain organic amines can be added to the photosensitizers above-described to further enhance the cure rate of the compositions of the instant invention in amounts up to about 500 percent, by weight, of the photosensitizer, preferably up to about 50 percent, by weight. The amines can be primary, secondary, or tertiary, and can be represented by the general formula:

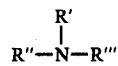

wherein R' and R" taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having 6 to about 12 ring carbon atoms; R'" has the same meaning as R' and R" with the exception that it cannot be hydrogen and that it cannot be aryl when both R' and R" are aryl. When taken together R" and R'" can be a divalent alkylene group $+C_nH_{2n}+$ having from 2 to about 12 carbon atoms, a divalent alkenylene group $+C_nH_{2n-1}+$ having from 3 to about 10 carbon atoms, a divalent alkadienylene group $+C_nH_{2n-2}+$ having from 5 to about 10 carbon atoms, a divalent alkatrienylene group $+C_nH_{2n-3}+$ having from 5 to about 10 carbon atoms, a divalent alkyleneoxyalkylene group $+C_xH_{2x}OC_xH_{2x}+$ having a total of from 4 to about 12 carbon atoms, or a divalent alkyleneaminoalkylene group

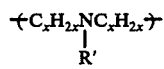

having a total of from 4 to about 12 carbon atoms. As previously indicated, the amines can be substituted with other groups; thus, the R', R" and R'" variables, whether taken singly or together, can contain one or more substituents thereon. The nature of such substituents is generally not of significant importance and any substituent group can be present that does not exert a pronounced deterrent effect on the ultraviolet crosslinking reaction.

Illustrative of suitable organic amines one can mention are methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, dodecylamine, tridodecylamine, tri-2-chloroethylamine, di-2-bromoethylamine, methanolamine, ethanolamine, diethanolamine, triethanolamine, methyldiethanolamine, dimethylethanolamine, isopropanolamine, propanolamine, diisopropanolamine, triisopropanolamine, butylethanolamine, dihexanolamine, 2-methoxyethylamine, di-2-ethylhexylamine, tri-2-ethoxyethylamine, 2-hydroxyethyldiisopropylamine, 2-aminoethylethanolamine, allylamine, butenylamine, dihexadienylamine, cyclohexylamine, tricyclohexylamine, trimethylcyclohexylamine, bis-methylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylyl-amine, tribenzylamine, triphenethylamine, benzyldimethylamine, benzyldihexylamine, trischlorophenethylenimine, N-methylethylenimine, N-cyclohexylethylenimine, piperidine, N-ethylpiperidine, 2-methylpiperidine, 1,2,3,4-tetrahydropyridine, 1,2-dihydropyridine, 2-, 3- and 4- picoline, morpholine, N-methyl morpholine, N-2-hydroxyethylmorpholine, N-2-ethoxyethylmorpholine, piperazine, N-methylpiperazine, N,N"-dimethylpiperazine, 2,2-dimethyl-1,3-bis[3-(N-morpholinyl)-propionyloxy]propane, 1,5-bis[3-(N-morpholinyl)-propionyloxy]diethyl ether, and the like. The preferred organic amines are the tertiary amines, with the alkanol amines being most preferred. The specific preferred amine activators are tri-ethanolamine, morpholine and methyldiethanolamine.

The compositions of the instant invention after being prepared in the ratios as set out above can be applied to the material to be coated by conventional means, including brushing, spraying, dipping, curtain and roll coating techniques, and may, if desired, be dried under ambient or oven conditions to provide coating films on the substrate. The substrate can be of any composition, e.g., wood, metal, paper, plastic, fabric, fiber, ceramic, concrete, plaster, glass, etc.

Typically a mixture of the compositions described above in combination with the perhalogen compound and, where utilized, the amine activator, is prepared and the composition applied to the desired wood substrate. It is then exposed to electromagnetic radiation having wave lengths of above about 2,000 Angstrom units, preferably from about 2,000 up to about 5,000 Angstroms. Exposure should be from a source located about 1 to 5 inches from the coating for a time sufficient to cause crosslinking of the composition and can range from about 0.1 seconds up to about 1 min./linear ft. Generally, the light radiation will have power of about 200 watts per linear inch.

The light radiation can be ultraviolet light generated from low, medium and high pressure mercury lamps. This equipment is readily available and its use is well known to those skilled in the art of radiation chemistry. Other sources include electron beam radiation, plasma arc, laser beams, etc.

EXAMPLE 1

54.0 parts of an epoxy di-acrylate prepared by reacting 2 moles of acrylic acid with about one mole of the diglycidyl ether of bisphenol A at 60° C. were blended with 33 parts of trimethylolpropane triacrylate, 10 parts of beta hydroxyethyl acrylate and 3.0 parts of 2-ethylhexyl acrylate. Various photoinitator systems were prepared using different photoinitiators. In the table set out below, the numbers under the various catalyst systems represent the parts per hundred weight of the various photinitiators employed. Tukon hardness is measured utilizing a standard Tukon micro knife. The coating thickness is a wet film thickness, utilizing a Bird wet film applicator. Coatings were applied to Bonderite 1000 cold rolled steel panels (Parker Division) and exposed to an Hanovia ultraviolet medium pressure mercury lamp of 200 watts/linear in. at a belt speed of 10 ft/min. The following results were obtained:

Table 1

| Photoreactants | Catalyst Systems (parts per hundred weight) | | | | | |
|---|---|---|---|---|---|---|
|  | a | b | c | d | e | f |
| Benzophenone | 3.0 | 1.5 | 1.5 | — | — | — |
| Benzil | — | — | — | 3.0 | 1.5 | 1.5 |
| Carbon Tetrachloride | — | 1.5 | — | — | 1.5 | — |
| Hexachloroethane | — | — | 1.5 | — | — | 1.5 |
| Dimethylaminoethanol | 2.0 | 2.0 | 2.0 | 2.0 | 2.0 | 2.0 |
|  | Tukon Hardness | | | | | |
| Film Thickness (mils) | a | b | c | d | e | f |
| 1.0 | 7.8 | 12.5 | 12.9 | 3.4 | 13.9 | 11.2 |
| 1.5 | 7.4 | 11.3 | 11.2 | 2.8 | 12.7 | 10.7 |
| 3.0 | 8.0 | 13.9 | 12.2 | 2.3 | 14.9 | 12.6 |

EXAMPLE 2

Utilizing the same evaluation procedure as in Example 1, a resin mixture of 80 parts of the epoxy diacrylate described in Example 1, 15 parts of beta hydroxyethyl acrylate and 5 parts of 2-ethylhexyl acrylate was prepared. A pigment paste of 50 parts of rutile titanium dioxide and 50 parts of trimethylolpropane triacrylate was prepared on a three roll mixer and ground over three passes. The resin portion was blended with the pigment paste on a 50—50 weight basis and catalyzed utilizing the catalyst in a parts per hundred weight ratio, as set forth in the table below. The catalyzed systems were cured and evaluated as described in Example 1.

Table 2

| Photoinitiators | Catalyst Systems | | | | | | | |
|---|---|---|---|---|---|---|---|---|
|  | a | b | c | d | e | f | g | h |
| Benzophenone | 3.0 | 1.5 | — | — | — | — | — | — |
| Benzil | — | — | 3.0 | 1.5 | 1.5 | 1.5 | — | — |
| Thioxanthone | — | — | — | — | — | 3.0 | 1.5 | — |
| Carbon tetrachloride | — | — | — | 1.5 | — | — | — | 1.5 |
| 1,1,1,2-Tetrachloroethane | — | — | — | — | 1.5 | — | — | — |
| Hexachloroethane | — | 1.5 | — | — | — | 1.5 | — | — |
| Dimethylethanolamine | 2.0 | 2.0 | 2.0 | 2.0 | 2.0 | 2.0 | 2.0 | 2.0 |
| Chloral | — | — | — | — | — | — | — | — |
| Iodoform | — | — | — | — | — | — | — | — |

Table 2-continued

| | Tukon Hardness (immediately after 3-second exposure) | | | | | | |
|---|---|---|---|---|---|---|---|
| Film Thickness | a | b | c | d | e | f | g | h |
| 1.0 mil | Surface cure | 2.3 | 5.3 | 13.2 | 10.5 | 15.1 | 7.2 | 20.5 |
| 1.5 mil | " | 2.0 | 3.5 | 11.6 | 7.5 | 12.7 | 6.5 | 19.5 |
| 3.0 mil | " | surface cure | 1.9 | 13.0 | 3.0 | 12.4 | 4.2 | 17.9 |

| | Catalyst Systems | | | | | | |
|---|---|---|---|---|---|---|---|
| Photoinitiators | i | j | k | l | m | n | o | p |
| Benzophenone | — | — | 1.5 | — | — | — | 1.5 | — |
| Benzil | — | — | — | 1.5 | — | 1.5 | — | — |
| Thioxanthone | 1.5 | 1.5 | — | — | 1.5 | — | — | 1.5 |
| Carbon tetrachloride | — | — | — | — | — | — | — | — |
| 1,1,1,2-Tetrachloroethane | 1.5 | — | — | — | — | — | — | — |
| Hexachloroethane | — | 1.5 | — | — | — | — | — | — |
| Dimethylethanolamine | 2.0 | 2.0 | 2.0 | 2.0 | 2.0 | 2.0 | 2.0 | 2.0 |
| Chloral | — | — | 1.5 | 1.5 | 1.5 | — | — | — |
| Iodoform | — | — | — | — | — | 1.5 | 1.5 | 1.5 |

| | Tukon Hardness (immediately after 3-second exposure) | | | | | | |
|---|---|---|---|---|---|---|---|
| Film Thickness | i | j | k | l | m | n | o | p |
| 1.0 mil | 8.4 | 15.2 | surface cure | 5.9 | 13.1 | 15.4 | 3.4 | 7.2 |
| 1.5 mil | 7.9 | 12.9 | " | 4.5 | 9.0 | 14.2 | surface cure | 5.9 |
| 3.0 mil | 5.9 | 9.2 | " | 3.2 | 5.5 | 14.3 | " | 4.4 |

As can be seen from the above examples, the terminal trihalogenated compounds of the instant invention exhibit excellent cure response properties when compared to standard photoinitiators which are not so modified. In all systems, they serve to reduce costly prior art initiators such as thioxanthone, in some cases actually increasing the resulting cure properties.

What is claimed is:

1. In an ultraviolet curable titanium dioxide pigmented protective coating composition, said coating based on the total weight of the curable composition, containing about 40 to about 100 percent, by weight, of an alpha beta ethylenically unsaturated vinyl polymerizable compound containing at least about two sites of vinyl polymerizable unsaturation, about 60 to about 0 percent of another alpha beta ethylenically unsaturated vinyl polymerizable composition containing no more than about one site of vinyl unsaturation, and up to about 15 percent, by weight of the curable composition, of an ultraviolet organo photoinitiator, the improvement of which consists essentially of utilizing as an additional photoinitiator about 25 to about 200 weight percent, based upon the standard photoinitiator, of a terminal trihalogen compound having the general formula

wherein X is bromine, chlorine, or iodine, or mixtures thereof, A is bromine, chlorine, or iodine, a $C_1$-$C_{12}$ hydrocarbon radical, a $C_1$-$C_{12}$ halogenated hydrocarbon, or a $C_1$-$C_{12}$ amine, carboxylic acid, alcohol, ketone, or aldehyde, and when X is iodine, A may, in addition, by hydrogen, wherein the A substituents are not interferingly reactive with the ultraviolet cure mechanism, and exposing the photoinitiator-containing coating to ultraviolet light at a power of about 200 watts for up to about 1 minute/linear foot.

2. The composition of claim 1 wherein the terminal trihalogen-containing photoinitiator is added at up to about 500 percent, by weight, level, based on the initial photoinitiator.

3. The composition of claim 1 wherein the terminal trihalogen photoinitiator is carbon tetrachloride.

4. The composition of claim 1 wherein the terminal trihalogen photoinitiator is 1,1,1,2-tetrachloroethane.

5. The composition of claim 1 wherein the terminal trihalogen photoinitiator is chloral.

6. The composition of claim 1 in admixture with about 50 to about 500 percent of an organic amine, by weight, based on the photoinitiators.

7. The composition of claim 6 wherein the organic amine is a tertiary alkanol amine.

8. The composition of claim 7 wherein the organic amine is selected from triethanol amine, morpholine, and methyldiethanol amine.

9. The composition of claim 1 wherein the other photoinitiator is selected from benzoin and its alkyl ethers, benzophenone and its derivatives, xanthone, thioxanthone, chlorinated thioxanthone, acetophenone derivatives and halogenated aliphatic and aromatic polychlorinated biphenyls and polyphenyls.

10. The composition of claim 1 in admixture with up to about 60 percent, by weight, based upon the total curable system of a polymeric material containing no polymerizable unsaturation.

11. The composition of claim 1 wherein the alpha beta ethylenically unsaturated vinyl polymerizable composition, containing no more than one site of vinyl polymerizable unsaturation, is present at the 10–30 percent, by weight, level.